US008991173B2

(12) United States Patent
Mavir et al.

(10) Patent No.: US 8,991,173 B2
(45) Date of Patent: Mar. 31, 2015

(54) LINEAR ACTUATOR FOR A VARIABLE-GEOMETRY MEMBER OF A TURBOCHARGER, AND A TURBOCHARGER INCORPORATING SAME

(75) Inventors: Robert Mavir, Lancashire (GB); Matus Rakoci, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 488 days.

(21) Appl. No.: 13/413,365

(22) Filed: Mar. 6, 2012

(65) Prior Publication Data

US 2013/0232970 A1 Sep. 12, 2013

(51) Int. Cl.

*F02D 23/00* (2006.01)
*F01B 19/00* (2006.01)
*F15B 15/10* (2006.01)
*F15B 15/28* (2006.01)
*G01B 7/14* (2006.01)
*F16K 31/00* (2006.01)

(52) U.S. Cl.

CPC ............. *F15B 15/10* (2013.01); *F15B 15/2861* (2013.01); *F05D 2220/40* (2013.01)
USPC ............. 60/602; 92/105; 92/5 R; 324/207.24; 251/64; 251/1

(58) Field of Classification Search

CPC ... F15B 15/10; F15B 15/2861; F05D 2220/40
USPC ................... 60/602; 92/132, 169.1, 105, 5 R; 324/207.24, 207.2, 207.21; 251/64
IPC ............. F15B 15/10, 15/28; F02B 37/12, 39/16
See application file for complete search history.

(56) References Cited

U.S. PATENT DOCUMENTS

| | | | | | |
|---|---|---|---|---|---|
| 2,880,706 | A | * | 4/1959 | Price | 92/105 |
| 2,988,353 | A | * | 6/1961 | Dietrich | 267/64.24 |
| 5,487,273 | A | * | 1/1996 | Elpern et al. | 60/602 |
| 5,538,332 | A | * | 7/1996 | Carroll | 251/64 |
| 6,247,900 | B1 | | 6/2001 | Archibald et al. | |
| 7,239,132 | B2 | | 7/2007 | Biester et al. | |
| 7,340,895 | B2 | * | 3/2008 | Noelle | 60/602 |
| 7,423,421 | B2 | | 9/2008 | Reichert et al. | |
| 2003/0020465 | A1 | | 1/2003 | Wolf | |
| 2004/0250678 | A1 | * | 12/2004 | Bonotto et al. | 92/5 R |
| 2009/0140730 | A1 | | 6/2009 | Newman et al. | |
| 2010/0127697 | A1 | * | 5/2010 | Storrie et al. | 324/207.24 |
| 2011/0079138 | A1 | * | 4/2011 | Storrie et al. | 324/207.24 |
| 2011/0262266 | A1 | | 10/2011 | Rakoci | |

FOREIGN PATENT DOCUMENTS

| | | | | | |
|---|---|---|---|---|---|
| DE | 10 2006 021 127 | B3 | | 8/2007 | |
| DE | 102006021130 | B3 | * | 8/2007 | F02B 39/16 |
| EP | 2161460 | A1 | * | 3/2010 | F15B 15/28 |
| EP | 2208893 | A2 | * | 7/2010 | F15B 15/28 |
| GB | 2468779 | A | * | 9/2010 | F15B 15/28 |
| JP | 2012102782 | A | * | 5/2012 | F15B 15/28 |

* cited by examiner

*Primary Examiner* — Thai Ba Trieu
(74) *Attorney, Agent, or Firm* — John C. James

(57) ABSTRACT

A linear actuator for a variable-geometry member of a turbocharger includes a piston/rod assembly that can axially translate and also pivot to a limited extent. A permanent magnet is mounted in a fixed position within the actuator. A non-magnetized flux carrier is mounted in the piston/rod assembly, and its movement alters the magnetic field of the magnet. A Halls effects sensor detects the magnetic field and the signals produced by the sensor are used for determining axial position of the piston/rod assembly.

14 Claims, 6 Drawing Sheets

LINEAR ACTUATOR FOR A VARIABLE-GEOMETRY MEMBER OF A TURBOCHARGER, AND A TURBOCHARGER INCORPORATING SAME

BACKGROUND OF THE INVENTION

The present disclosure relates to exhaust gas-driven turbochargers having a variable-geometry member for regulating the flow of exhaust gas through the turbine. The disclosure relates in particular to a linear actuator for effecting movement of the variable-geometry member.

Turbochargers for internal combustion engines often include some type of variable-geometry member for regulating exhaust gas flow through the turbine so as to provide a greater degree of control over the amount of boost provided to the engine by the turbocharger. Such variable-geometry members can include variable vane arrangements, waste gates, sliding pistons, etc.

Linear actuators are frequently employed for providing the motive force to move the variable-geometry member of the turbocharger. An actuator rod or shaft of the actuator is mechanically coupled to the variable-geometry member. Examples of such linear actuators include pneumatic actuators operated by vacuum derived from the engine's intake system.

In order to accurately control the position of the variable-geometry member, typically a sensor assembly is incorporated in the linear actuator for sensing the position of the actuator rod along the nominal displacement path of the actuator rod. One type of sensor assembly comprises a permanent magnet and a Hall effects sensor. The magnet is housed within the movable part of the actuator that imparts movement to the actuator rod. The sensor is disposed in the fixed part of the actuator, proximate the magnet. The nominal displacement path of the actuator rod is usually coincident with the longitudinal axis of the actuator rod. However, often the actual movement of the actuator rod is not a pure translation along the longitudinal axis of the rod, but also includes some amount of rotation of the rod about one or more axes that are not parallel to the longitudinal axis. This complex movement of the actuator rod complicates the accurate sensing of the actuator rod position by the sensor assembly.

Others have tried to address this problem by providing a guiding structure for the actuator rod. The guiding structure surrounds and contacts the actuator rod and constrains it to pivot about a fixed pivot point that is proximate the sensor. The magnet is contained in a part of the rod adjacent the sensor. The objective of this arrangement is to keep the radial spacing between the magnet and the sensor constant regardless of whether the rod is purely translating or undergoing a complex translation and rotation movement.

BRIEF SUMMARY OF THE DISCLOSURE

The present disclosure concerns a vacuum-operated linear actuator for a variable-geometry member of a turbocharger. In accordance with one embodiment described herein, a turbocharger for an internal combustion engine comprises a compressor wheel and a turbine wheel mounted on a common shaft, the compressor wheel being disposed in a compressor housing and the turbine wheel being disposed in a turbine housing, the turbine housing defining passages for receiving exhaust gas, directing the exhaust gas to the turbine wheel, and discharging the exhaust gas from the turbine housing. The turbocharger further includes a variable-geometry member operable to regulate flow of exhaust gas through the turbine housing, and a vacuum-operated linear actuator coupled with the variable-geometry member and operable to cause movement of the variable-geometry member.

The linear actuator comprises an enclosure having a first end wall and an opposite second end wall spaced apart along an axial direction, and a flexible diaphragm within the enclosure, the enclosure and diaphragm cooperating to define an interior chamber capable of supporting a fluid pressure differential across the diaphragm. A metallic generally cup-shaped piston has a bottom wall connected to the diaphragm and a side wall extending from the bottom wall generally toward the first end wall of the enclosure. A spring is engaged between the first end wall of the enclosure and the piston for biasing the piston and the diaphragm in a direction opposite the fluid pressure differential across the diaphragm. An actuator rod is connected to the piston and the diaphragm and extends generally axially and penetrates through the second wall of the enclosure.

The actuator further comprises a sensor assembly comprising a permanent magnet and a sensor each fixedly mounted with respect to the enclosure and proximate the first end wall of the enclosure, and a non-magnetized metallic flux modifier mounted on the piston. The flux modifier can be contained in a generally cylindrical carrier, the carrier extending generally axially between a proximal end proximate the first end wall to a distal end proximate the piston. Movement of the diaphragm and piston result in movement of the carrier and the flux modifier contained therein, and the movement of the flux modifier causes an alteration of the magnetic field of the magnet. This alteration of the magnetic field is sensed by the sensor, which produces an output signal indicative of the magnetic field.

A slide-pivot bearing is mounted at the first end wall of the enclosure and receives the carrier, the slide-pivot bearing permitting the carrier to move axially and to pivot relative to the enclosure. The carrier is connected to the bottom wall of the piston by an articulated joint, the articulated joint permitting pivotal movement of the carrier relative to the piston such that a given amount of angular misalignment of the piston relative to the axial direction results in a lesser amount of angular misalignment of the carrier relative to the axial direction.

Alternatively, the flux modifier does not have to be contained in a generally cylindrical carrier.

The sensor can comprise a Hall effects sensor.

In one embodiment, the articulated joint between the carrier and the piston comprises a socket member affixed to the bottom wall of the piston and defining a socket, and an end portion of the carrier that is received in the socket, the socket presenting an inner wall portion of generally spherical configuration, the end portion presenting a surface of generally spherical configuration engaging the inner wall portion of the socket.

The actuator in one embodiment includes a crimping member affixed to the bottom wall of the piston, the socket member being crimped by the crimping member.

In one embodiment, an end portion of the actuator rod extends into an interior of the socket, and the actuator includes a resilient biasing member disposed between the end portion of the actuator rod and a surface of the carrier, the biasing member exerting a generally axial pre-load on the carrier.

Alternatively, the flux modifier can be connected to the piston by a flexible member that flexes to allow the flux modifier to pivot relative to the piston.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The turbocharger and actuator now will be described more fully hereinafter with reference to the accompanying drawings in which some but not all possible embodiments are shown. Indeed, the turbocharger and actuator may be embodied in many different forms and should not be construed as limited to the embodiments set forth herein; rather, these embodiments are provided so that this disclosure will satisfy applicable legal requirements. Like numbers refer to like elements throughout.

Figure 1:
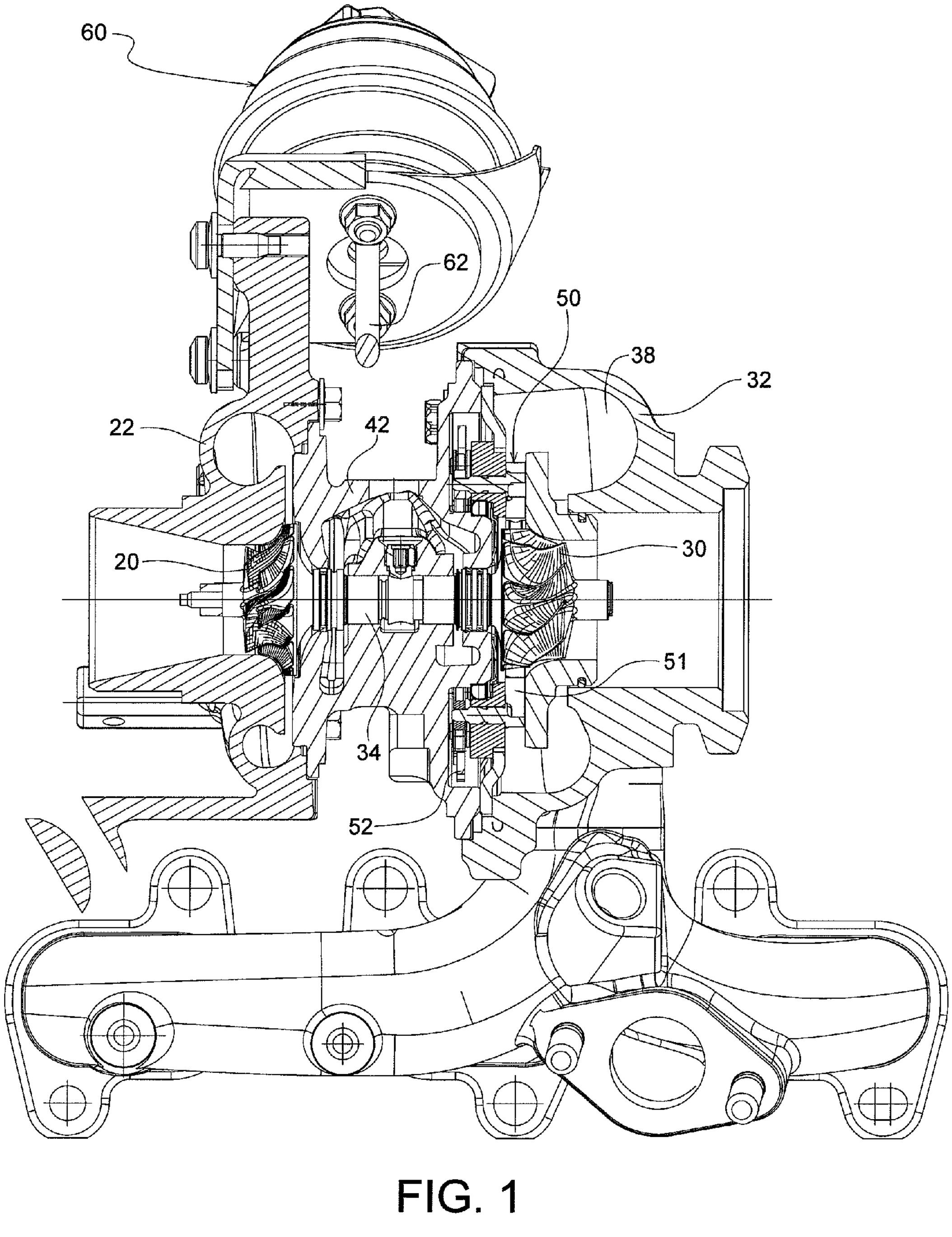
FIG. 1 is a cross-sectional view of a turbocharger and actuator in accordance with one embodiment of the invention.

A turbocharger and actuator according to one embodiment are depicted in FIG. 1. The turbocharger comprises a compressor wheel 20 mounted in a compressor housing 22 and a turbine wheel 30 mounted in a turbine housing 32. The compressor wheel and turbine wheel are mounted on opposite ends of a shaft 34 that is supported in bearings mounted in a center housing 42. The compressor housing 22 is fastened to one side of the center housing 42 and the turbine housing 32 is fastened to the other side of the center housing. Exhaust gas from an engine is fed into an inlet in the turbine housing, into a volute 38 that surrounds the turbine wheel 30. The exhaust gas is fed from the volute 38 into the turbine wheel 30 through a variable nozzle 50. In the illustrated embodiment, the variable nozzle 50 includes variable vanes 51 whose setting angles can be varied via rotation of a unison ring 52 about its axis, which axis substantially coincides with the rotation axis of the turbine wheel 30.

The unison ring 52 is rotated by a mechanical linkage (not visible in FIG. 1) that is operated by a linear actuator 60. The actuator 60 includes an actuator rod 62 that projects out from the actuator and is coupled with the mechanical linkage in suitable fashion. The details of coupling the actuator to the variable-geometry member of the turbine will vary from turbocharger to turbocharger, depending on the particular design of the turbocharger and its variable-geometry member. This is well understood by persons of ordinary skill in the turbocharger art, and hence need not be described in detail here.

Figure 2:
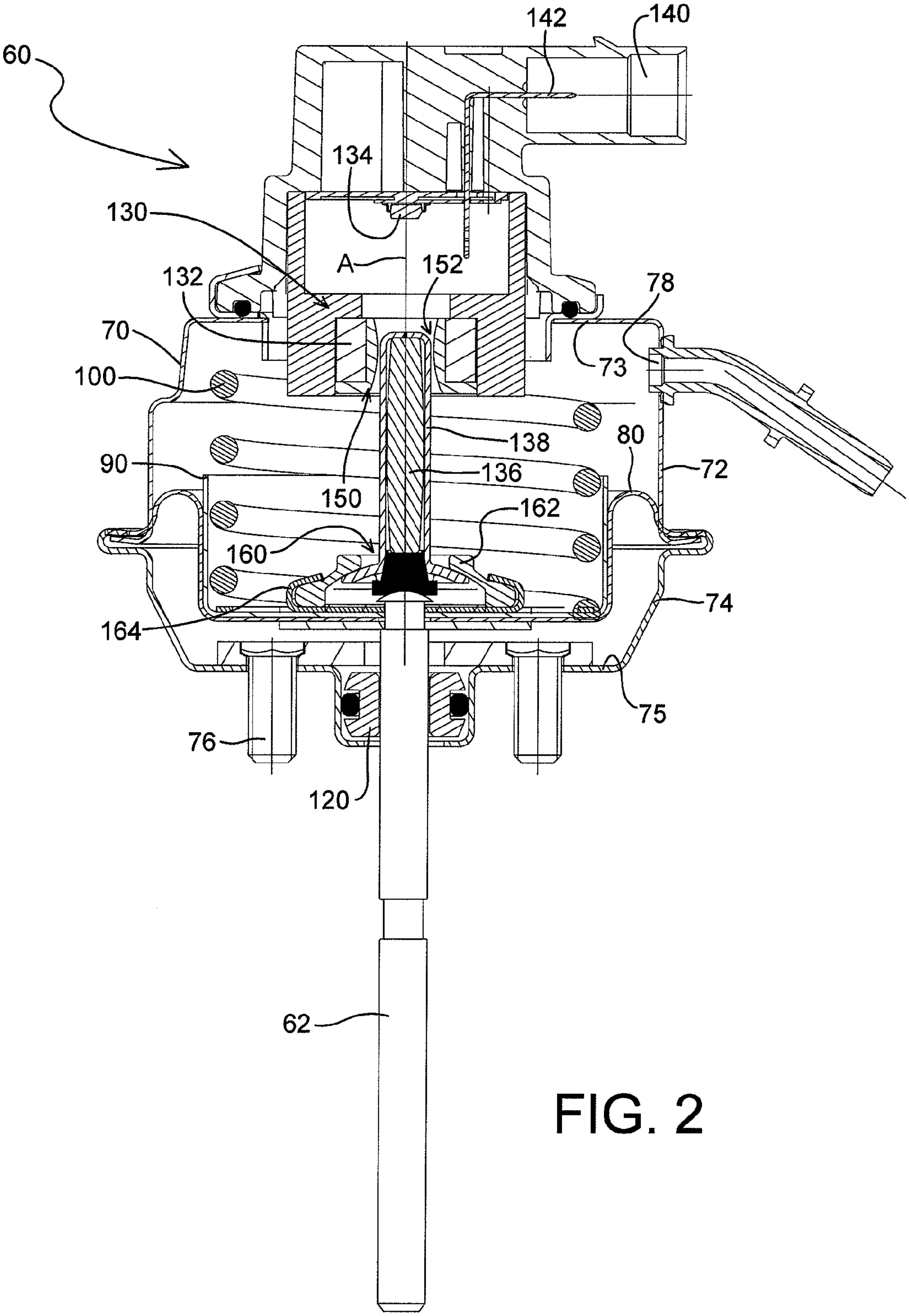
FIG. 2 is a cross-sectional view of an actuator in accordance with one embodiment of the invention, in a relatively extended position.

The present disclosure concerns in particular the design of the actuator 60, and therefore the present description will focus on the actuator. FIG. 2 shows a cross-sectional view of the actuator 60 in accordance with one embodiment. Broadly, the actuator comprises a fixed portion that includes an enclosure or housing 70, and a movable portion that includes a diaphragm 80, a cup-shaped member or piston 90, a coil spring 100, and the actuator rod 62. The housing 70 is made up of two generally cup-shaped parts 72 and 74 that are connected to each other, open end-to-open end, so as to form an enclosure. The housing has a first end wall 73 formed by the part 72 and an opposite second end wall 75 formed by the part 74. The diaphragm 80 is a sheet of flexible and resilient material that is fluid-impervious, such as a rubber or rubber-like material. An outer periphery of the diaphragm is captured between the two housing parts 72 and 74 in a fluid-sealed manner, such that the diaphragm divides the interior of the housing into an upper chamber and a lower chamber (with respect to the orientation shown in FIG. 2). The upper chamber is sealed with respect to atmosphere, while the lower chamber is vented to atmosphere. The housing 70 is attached, such as by bolts 76, to a bracket (not shown) that in turn is attached by bolts to one of the fixed housing structures of the turbocharger.

The cup-shaped piston 90 of the actuator is disposed with its closed bottom wall against the upper surface of the diaphragm 80 and its open end facing upwardly. The coil spring 100 is disposed substantially concentrically with respect to the piston 90 and has one end engaged against the bottom wall of the piston 90 and its opposite end engaged against an inner surface of the upper housing part 72 (although the turn of the coil spring that engages the housing part 72 cannot be seen in the cross-section of FIG. 2).

The actuator includes a fluid passage 78 that extends into the upper chamber of the housing 70, through which fluid (typically air) can be evacuated from or fed into the upper chamber. When a vacuum is exerted through the fluid passage, the upper chamber is partially evacuated to create a vacuum in the upper chamber. Because the lower chamber on the other side of the diaphragm 80 is vented to atmosphere, a fluid pressure differential exists across the diaphragm, urging it and the piston 90 upwardly so as to compress the spring 100. The position the piston 90 moves to depends on the degree of vacuum relative to the spring force. The actuator rod 62 has one end connected to the piston 90 and hence it moves along with the piston. The other end of the rod 62 is coupled to the variable-geometry member of the turbine, such that linear movement of the rod 62 in one direction or the other (as regulated by the amount of vacuum exerted on the actuator chamber) results in movement of the variable-geometry member.

The actuator rod 62 passes through a ring-shaped gimbal 120, located adjacent the second end wall 75 of the enclosure 70. The gimbal keeps the portion of the rod within the gimbal generally centered relative to the actuator housing but permits the rod to undergo some degree of pivoting about axes transverse to the longitudinal axis of the rod. This pivoting ability is necessary because as a result of the characteristics of the variable-geometry mechanism to which the distal end of the rod 62 is connected, the rod 62 in some turbochargers will not purely translate parallel to its longitudinal axis, but will undergo a complex motion made up primarily of a translation component parallel to the longitudinal axis but also including a secondary rotation component about at least one axis that is not parallel to the longitudinal axis of the rod. This complex motion of the actuator rod 62 is also imparted to the piston 90 because of the substantially rigid connection therebetween. This in turn complicates the accurate sensing of the actuator position, as further described below.

The actuator 60 also includes a sensor assembly 130 for sensing the position of the actuator rod 62 along the nominal longitudinal axis A of the actuator (FIG. 2). The sensor assembly 130 includes a permanent magnet 132, a sensor 134, and a flux modifier 136. The sensor assembly 130 includes a socket portion 140 for receiving a plug (not shown). The socket portion 140 houses electrically conductive pins 142 that are electrically connected to the sensor 134. The plug includes receptacles that respectively receive the pins 142, and conductors of the plug carry signals on the pins to a processor (e.g., the vehicle ECU, not shown) that processes the signals to determine the actuator position from the signals.

The sensor 134 can be a Hall effects sensor or the like. The flux modifier 136 is a non-magnetized metallic member having a generally rod-shaped configuration. The flux modifier is contained in a generally cylindrical carrier 138. The carrier can be non-metallic (e.g., plastic), and has an upper or proximal end proximate the first end wall 73 and the sensor 134, and an opposite lower or distal end remote from the sensor and closer to the second end wall 75. The magnet 132 is a ring-shaped magnet and is contained in a housing of an annular slide-pivot bearing 150 located adjacent the first end wall 73. The slide-pivot bearing 150 defines a passage 152 sized to receive the carrier 138 with sufficient radial clearance to allow the carrier to freely move axially as well as to pivot to a limited extent. Toward this end, the bearing surface defined by the passage 152 of the bearing 150 can have a shape described by rotating a circular arc (which is convex in the radially inward direction) along a circular path about the central longitudinal axis of the passage 152 so as to generate a surface of revolution. In other words, the surface defining the passage 152 has the shape of the radially inner surface of a torus. It is not essential, however, for the shape to be precisely toroidal, and variations can be employed, as long as the carrier 138 is freely able to translate axially and pivot as further described below.

The lower or distal end of the carrier 138 is connected by an articulated joint 160 to the bottom wall of the piston 90. The articulated joint 160 is formed by a socket member 162 affixed to the bottom wall of the piston 90 and defining a socket, and an enlarged end portion 139 of the carrier 138 that is received in the socket. The socket presents an inner wall portion of generally spherical configuration (or, more accurately, configured generally as the interior surface of a hollow sphere), and the end portion 139 presents a surface of generally spherical configuration engaging the inner wall portion of the socket. The opening into the socket is of smaller diameter than the end portion 139 but is substantially larger in diameter than the generally cylindrical part of the carrier 138. Accordingly, the end 139 of the carrier 138 is able to pivot or swivel relative to the socket member 162 as well as to undergo lateral movement relative to the socket member, within limits set by the size of the opening in the socket member 162 through which the carrier extends. The carrier 138 and socket member 162 in effect form a type of ball-and-socket joint 160.

A crimp ring 164 or the like is crimped onto the socket member 162. The crimp ring 164 is rigidly affixed to the bottom wall of the piston 90, and the actuator rod 62 is also rigidly affixed to the piston 90. An end of the rod 62 extends into the socket defined by the socket member 162 An elastomeric biasing member 166 is disposed between this end of the rod and the carrier 138. The biasing member 166 is essentially a plug that plugs up the open end of the hollow cylindrical carrier 138 and engages the flux modifier 136 contained therein so as to hold the flux modifier in a fixed position within the carrier. The biasing member also exerts a generally axial pre-load on the carrier in the upward direction in FIG. 2.

Figure 3:
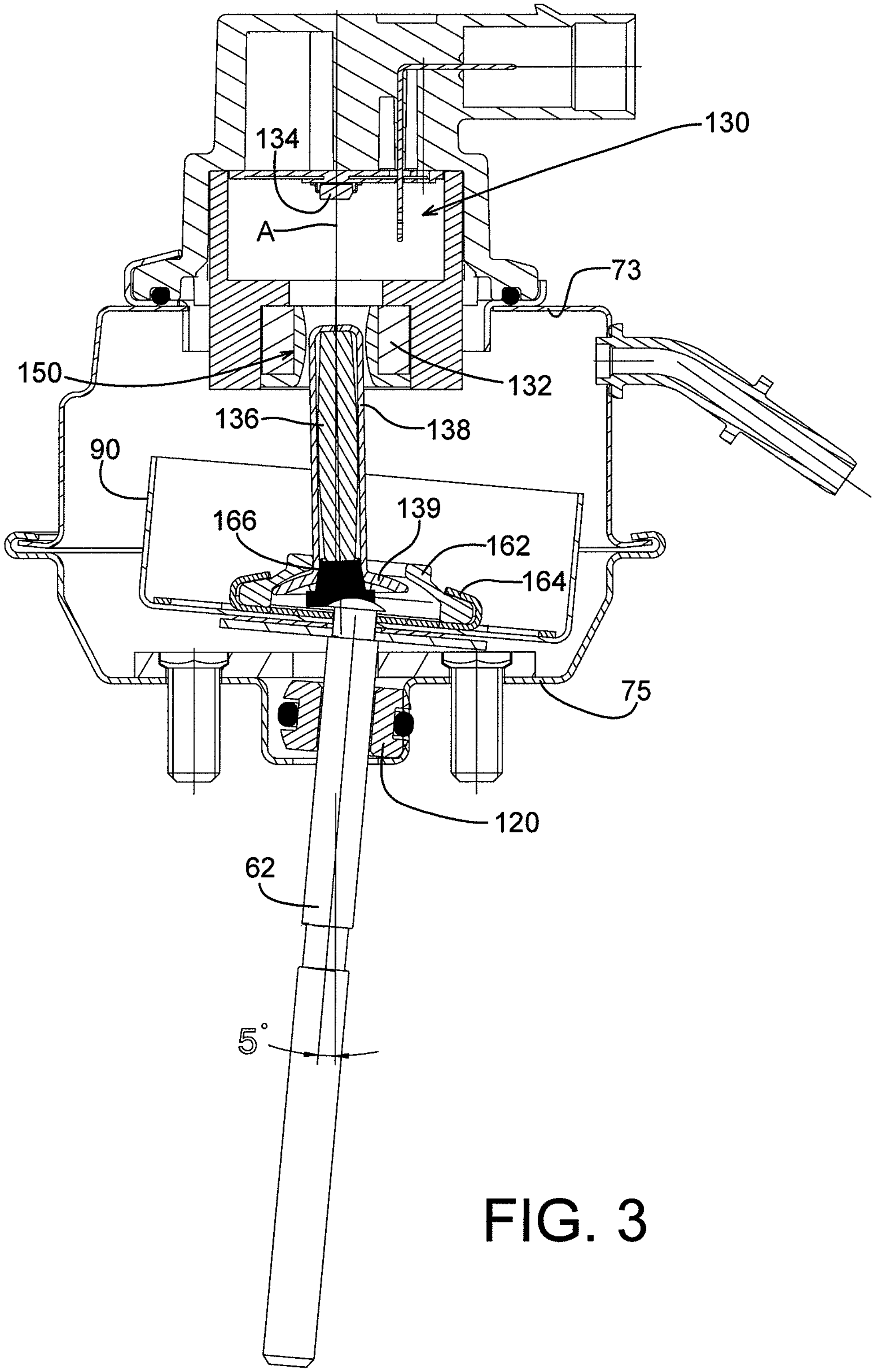
FIG. 3 is a cross-sectional view of the actuator in a relatively extended position (with the coil spring and diaphragm removed, for clarity), where the actuator rod and associated components have pivoted 5 degrees relative to the axial direction of the actuator.
Figure 4:
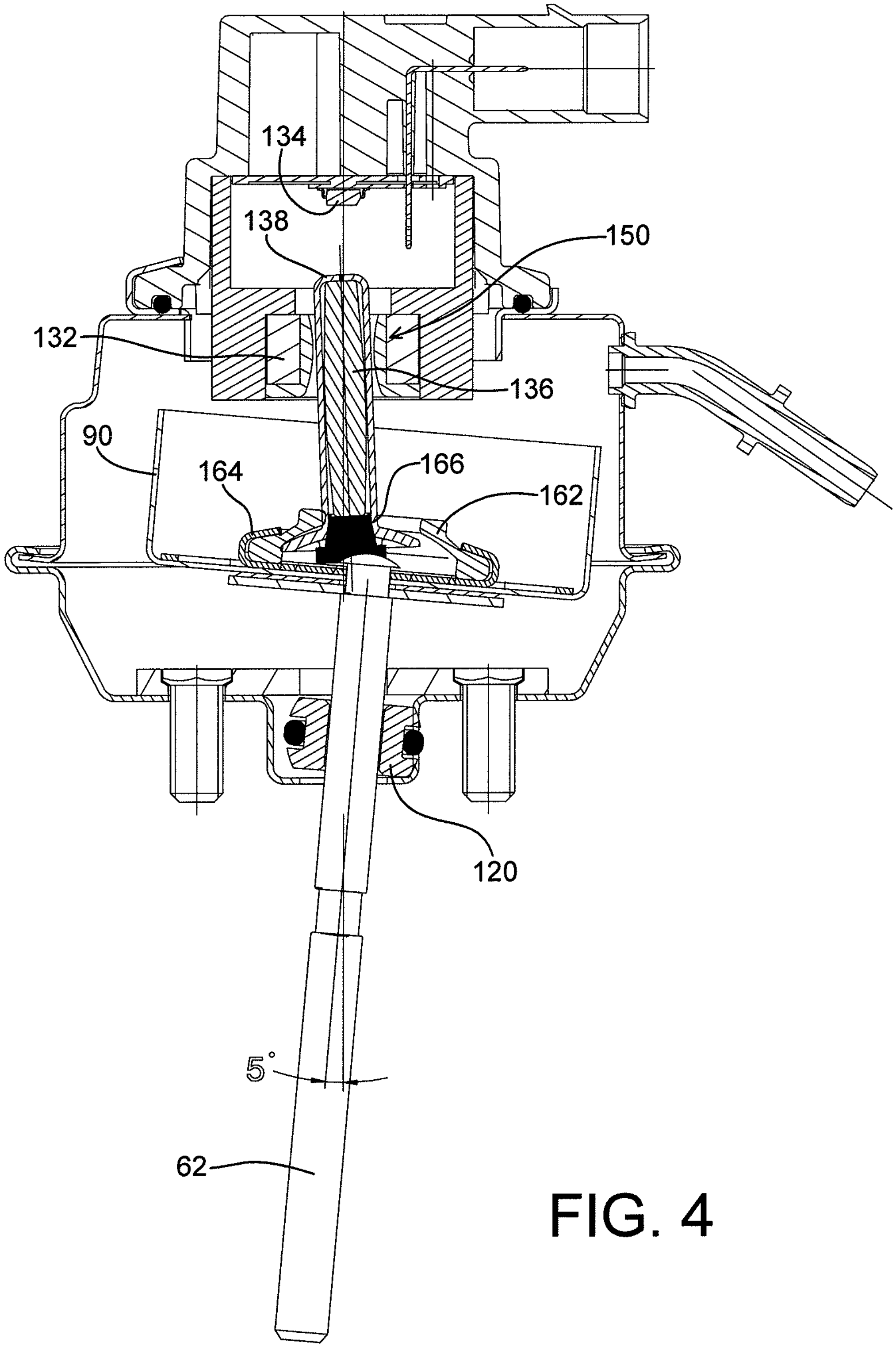
FIG. 4 is a view similar to FIG. 3, with the actuator in a partially retracted position.
Figure 5:
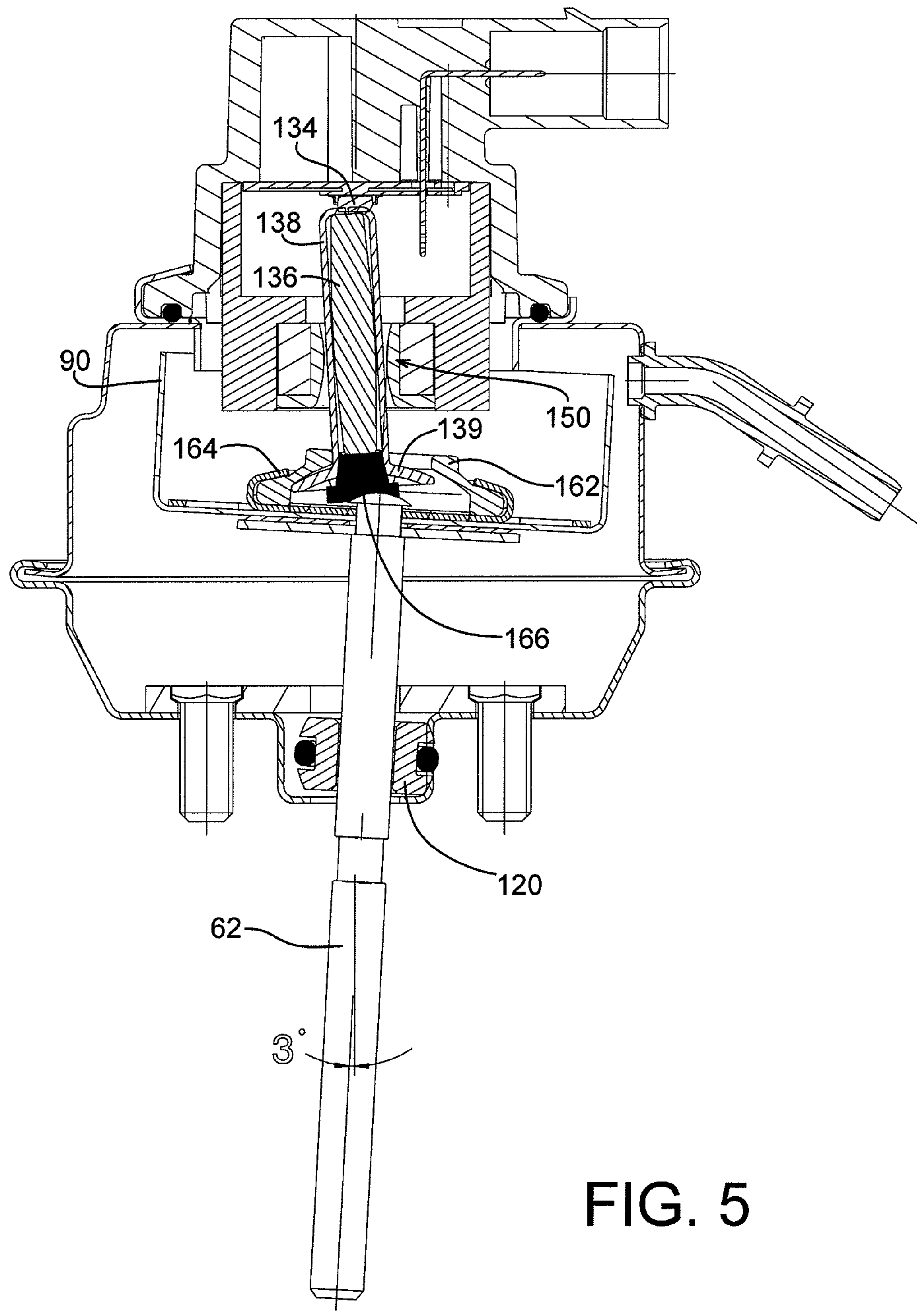
FIG. 5 is a view similar to FIG. 3, with the actuator in still further retracted position, where the actuator rod and associated components have pivoted 3 degrees relative to the axial direction of the actuator.

The actuator rod 62, piston 90, crimp ring 164, and socket member 162 collectively form an assembly that can move axially and also pivot relative to the enclosure 70 and other fixed components of the actuator. Ideally this piston/rod assembly would undergo a pure translation when the actuator extends and retracts the actuator rod 62, but as previously noted, the mechanics of the connection between the rod 62 and the variable-geometry member being actuated may be such that the rod 62 is forced to pivot to some extent during actuation. This is depicted for example in FIGS. 3 through 5. FIG. 3 depicts the actuator in a relatively extended position (i.e., with the piston 90 located adjacent the end wall 75, and with the spring, which is removed from FIG. 3 for clarity, relatively uncompressed). The piston/rod assembly has pivoted 5 degrees relative to the actuator axis A. The gimbal 120 permits this pivoting, but because the gimbal is axially spaced from the point where the actuator rod 62 connects to the piston 90, the pivoting of the rod 62 results in the piston 90 moving along a circular arc whose center is defined by the gimbal. Thus, the piston 90 tilts 5 degrees relative to axial and also moves closer to one side wall of the enclosure 70. This in turn causes the socket member 162 to move off-center and pivot, and the articulated joint between the socket member and the carrier 138 allows this movement in such a way that the carrier 138 pivots to a much less extent than the 5 degrees that the piston/rod assembly pivots.

The amount of pivoting of the carrier 138 is a function primarily of the amount of pivoting of the piston/rod assembly and the axial position of the carrier 138. As the carrier 138 is retracted (i.e., moved upward in FIGS. 2 through 5), a given amount of pivoting of the piston/rod assembly causes an increasing amount of pivoting of the carrier. This is because the carrier is pivoting about the slide-pivot bearing 150, and retraction of the carrier reduces the radius of the circular-arc path that the end 139 of the carrier moves along. Accordingly, for a given amount of lateral movement of the end 139 of the carrier, the more the carrier is retracted, the more the carrier pivots (compare, for example, FIG. 3 with FIG. 5). The articulated joint 160, however, substantially reduces the amount of pivoting of the carrier relative to what would occur without the joint. Thus, the carrier 138 is able to move along a path that is relatively axial, with only a relatively small amount of pivoting motion superimposed on the generally axial movement. This benefits the accuracy of position sensing by the sensor assembly 130.

As the actuator is operated to either extend or retract the piston/rod assembly, the flux modifier 136 contained in the carrier 138 moves axially and also pivots to a relatively small extent. The axial movement of the flux modifier 136 causes the magnetic field of the magnet 132 to change. Changes in the magnetic field are sensed by the sensor 134, which produces electrical signals indicative of the magnetic field. The characteristics of the magnetic field are correlated with the axial location of the flux modifier. In this way, the axial position of the flux modifier, and hence the axial position of the rod 62, can be determined based on the signals from the sensor 134.

Many modifications and other embodiments of the inventions set forth herein will come to mind to one skilled in the art to which these inventions pertain having the benefit of the teachings presented in the foregoing descriptions and the associated drawings. For example, one embodiment of an actuator has been described in which there is an articulated joint 160 connecting a carrier 138 to the piston 90, the joint comprising essentially a ball joint. However, there are other ways in which such a joint can be implemented, and the invention is not limited to any particular implementation.

Figure 6:
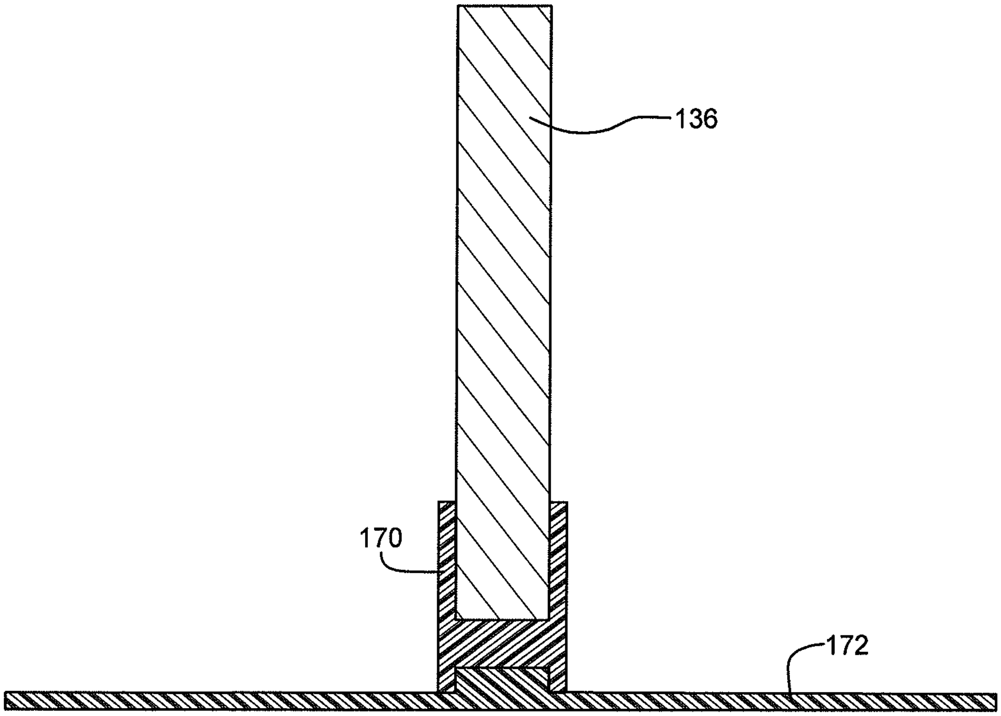
FIG. 6 depicts an assembly of a flux modifier and flexible attachment device in accordance with a further embodiment.

FIG. 6 for instance depicts an assembly in which the flux modifier 136 is not contained in a generally cylindrical carrier. The distal end of the flux modifier 136 is fastened to a flexible member 170, which can be a flexible plastic material for example. The flexible member 170 in turn is fastened to a substantially rigid member 172, which for example can be a rigid plastic material. The member 172 would be affixed to the piston in suitable fashion. The flexible member 170 is able to flex and allow the flux modifier 136 to pivot relative to the member 172 and piston.

The flexible member 172 as illustrated in FIG. 6 is relatively short compared to the flux modifier, such that the majority of the length of the flux modifier is not contained by the flexible member. Alternatively, however, the flexible member could be longer to contain most or all of the length of the flux modifier, if desired.

Additionally, the flexible member 170 connecting the flux modifier 136 to the piston could comprise a spring of suitable type, rather than a flexible plastic member.

Other modifications to the specific embodiments described above can also be made. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vacuum-operated linear actuator for a variable-geometry member of a turbocharger, comprising:

an enclosure having a first end wall and an opposite second end wall spaced apart along an axial direction, and a flexible diaphragm within the enclosure, the enclosure and diaphragm cooperating to define an interior chamber for supporting a fluid pressure differential across the diaphragm;

a piston that is metallic and has a cup-shaped configuration having a bottom wall connected to the diaphragm and a side wall extending from the bottom wall toward the first end wall of the enclosure;

a spring engaged between the first end wall of the enclosure and the piston for biasing the piston and the diaphragm in a direction opposite the fluid pressure differential across the diaphragm;

an actuator rod connected to the piston and the diaphragm and extending axially and penetrating through the second wall of the enclosure;

a sensor assembly comprising a permanent magnet and a sensor each fixedly mounted with respect to the enclosure and proximate the first end wall of the enclosure, and a non-magnetized metallic flux modifier mounted on the piston, the flux modifier extending axially between a proximal end proximate the first end wall to a distal end proximate the piston, movement of the diaphragm and piston resulting in movement of the flux modifier, said movement of the flux modifier causing an alteration of the magnetic field of the magnet, said alteration of the magnetic field being sensed by the sensor, which produces an output signal indicative of the magnetic field;

a slide-pivot bearing mounted at the first end wall of the enclosure and receiving the flux modifier, the slide-pivot bearing permitting the flux modifier to move axially and to pivot relative to the enclosure; and an articulated joint connecting the flux modifier to the bottom wall of the piston, the articulated joint permitting pivotal movement of the flux modifier relative to the piston.

2. The actuator of claim 1, wherein the sensor comprises a Hall effects sensor.

3. The actuator of claim 1, wherein the flux modifier is contained in a carrier, the carrier having a proximal end proximate the first end wall of the enclosure and an opposite distal end proximate the piston.

4. The actuator of claim 3, wherein the articulated joint comprises a socket member affixed to the bottom wall of the piston and defining a socket, and an end portion of the carrier that is received in the socket.

5. The actuator of claim 4, further comprising a crimping member affixed to the bottom wall of the piston, the socket member being crimped by the crimping member.

6. The actuator of claim 4, wherein an end portion of the actuator rod extends into an interior of the socket, and further comprising a resilient biasing member disposed between the end portion of the actuator rod and a surface of the carrier, the biasing member exerting an axial pre-load on the carrier.

7. The actuator of claim 1, wherein the flux modifier is connected to the piston by a flexible member that flexes to allow the flux modifier to pivot relative to the piston.

8. A turbocharger having a variable-geometry mechanism, the turbocharger comprising:

a compressor wheel and a turbine wheel mounted on a common shaft, the compressor wheel being disposed in a compressor housing and the turbine wheel being disposed in a turbine housing, the turbine housing defining passages for receiving exhaust gas, directing the exhaust gas to the turbine wheel, and discharging the exhaust gas from the turbine housing;

a variable-geometry member operable to regulate flow of exhaust gas through the turbine housing; and a vacuum-operated linear actuator coupled with the variable-geometry member and operable to cause movement of the variable-geometry member, the linear actuator comprising:

an enclosure having a first end wall and an opposite second end wall spaced apart along an axial direction, and a flexible diaphragm within the enclosure, the enclosure and diaphragm cooperating to define an interior chamber for supporting a fluid pressure differential across the diaphragm;

a piston that is metallic and has a cup-shaped configuration having a bottom wall connected to the diaphragm and a side wall extending from the bottom wall toward the first end wall of the enclosure;

a spring engaged between the first end wall of the enclosure and the piston for biasing the piston and the diaphragm in a direction toward the second end wall of the enclosure;

an actuator rod connected to the piston and the diaphragm and extending axially and penetrating through the second wall of the enclosure; a sensor assembly comprising a permanent magnet and a sensor each fixedly mounted with respect to the enclosure and proximate the first end wall of the enclosure, and a non-magnetized metallic flux modifier mounted on the piston, the flux modifier extending axially between a proximal end proximate the first end wall to a distal end proximate the piston, movement of the diaphragm and piston resulting in movement of the flux modifier, said movement of the flux modifier causing an alteration of the magnetic field of the magnet, said alteration of the magnetic field being sensed by the sensor, which produces an output signal indicative of the magnetic field;

a slide-pivot bearing mounted at the first end wall of the enclosure and receiving the flux modifier, the slide-pivot bearing permitting the flux modifier to move axially and to pivot relative to the enclosure; and an articulated joint connecting the flux modifier to the bottom wall of the piston, the articulated joint permitting pivotal movement of the flux modifier relative to the piston.

9. The turbocharger of claim 8, wherein the sensor comprises a Hall effects sensor.

10. The turbocharger of claim 8, wherein the flux modifier is contained in a carrier, the carrier having a proximal end proximate the first end wall of the enclosure and an opposite distal end proximate the piston.

11. The turbocharger of claim 10, wherein the articulated joint comprises a socket member affixed to the bottom wall of the piston and defining a socket, and an end portion of the carrier that is received in the socket.

12. The turbocharger of claim 11, further comprising a crimping member affixed to the bottom wall of the piston, the socket member being crimped by the crimping member.

13. The turbocharger of claim 11, wherein an end portion of the actuator rod extends into an interior of the socket, and further comprising a resilient biasing member disposed between the end portion of the actuator rod and a surface of the carrier, the biasing member exerting an axial pre-load on the carrier.

14. The turbocharger of claim 8, wherein the flux modifier is connected to the piston by a flexible member that flexes to allow the flux modifier to pivot relative to the piston.

* * * * *